Patented Apr. 28, 1931

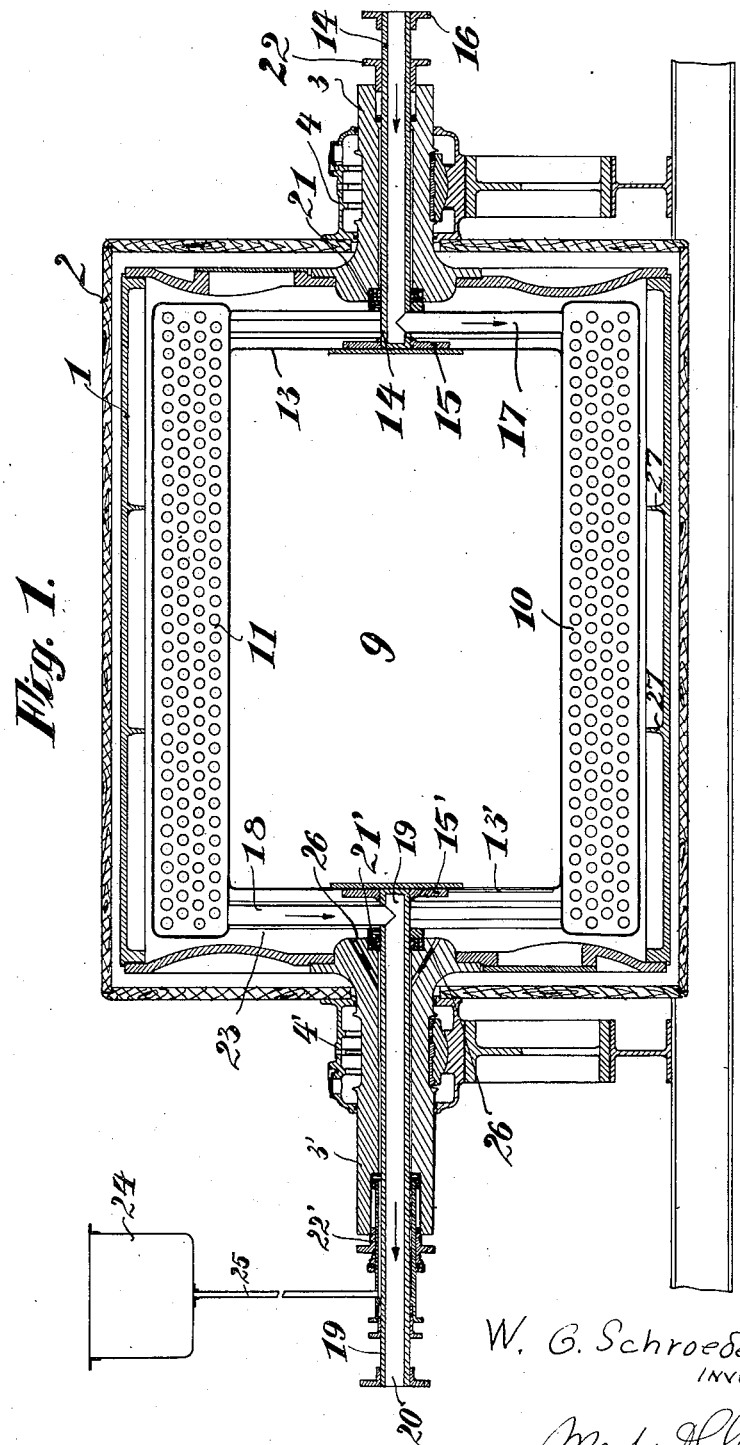

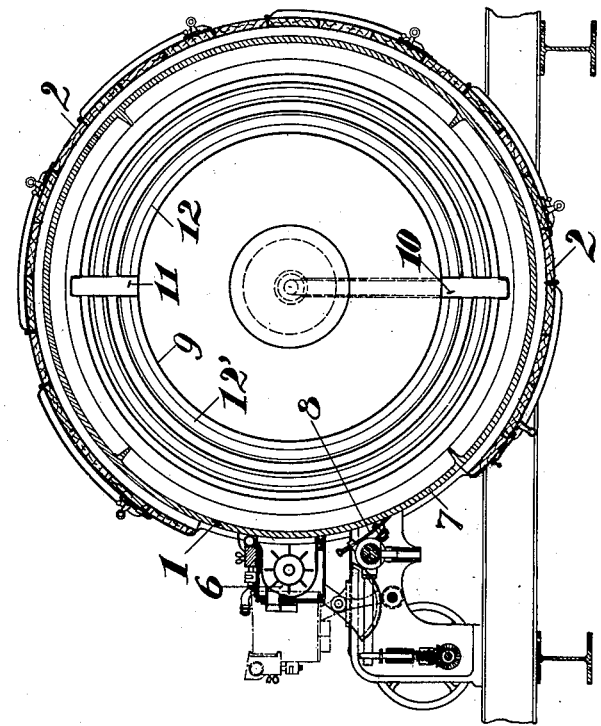
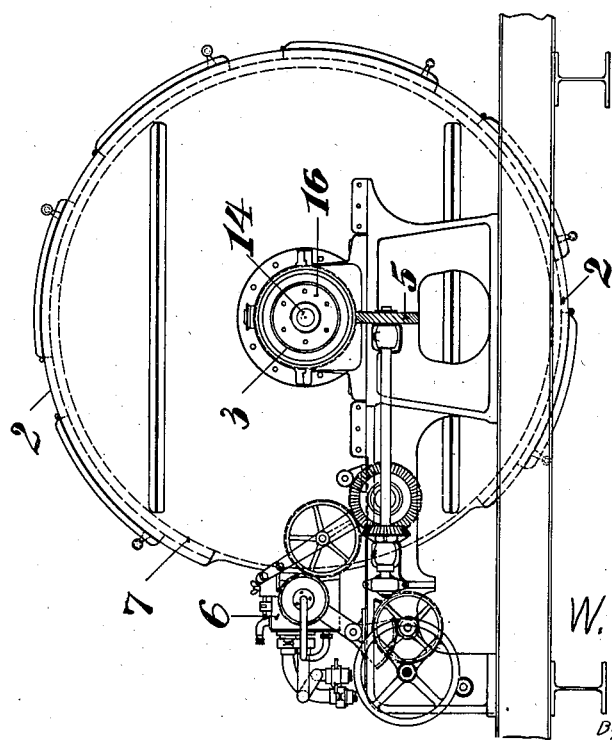

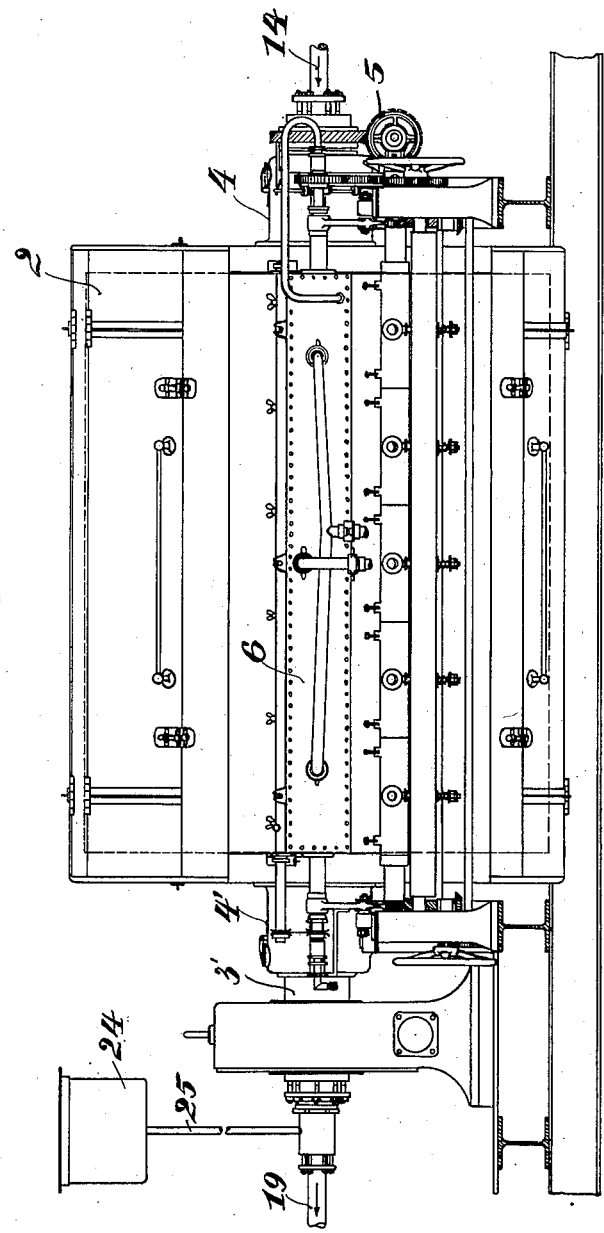

1,803,212

UNITED STATES PATENT OFFICE

WILHELM GOTTHILF SCHROEDER, OF LUBECK, GERMANY

REFRIGERATING PROCESS AND APPARATUS FOR COOLING FAT EMULSIONS SUCH AS MARGARINE AND THE LIKE

Application filed August 19, 1929, Serial No. 386,870, and in Germany February 4, 1926.

For cooling fat emulsions in the margarine industry for example cooling drums are used in which the material to be cooled is applied in a thin layer on the surface of the drum casing and is cooled down. In order to produce a rapid cooling of the emulsion layer, brine cooled down to −15 to 20° was pumped through the interior space of such a cooling drum so that the emulsion applied to the surface of the drum casing solidified as rapidly as possible; the solidified emulsion was then scraped off by means of sharp knives applied to the drum, it fell onto a conveying device and was worked up in a kneading machine to a finished butter-like product.

In order to produce a desired high output with such a cooling drum, it was heretofore necessary to pump a large quantity of strongly cooled brine (about 20 to 30 litres per 1 kg. of margarine) through the drum casing. The strong cooling of such a large amount of brine, however, necessitates with larger scale production a somewhat large plant of refrigerating machines, a large amount of space, and considerable driving power. Hitherto the brine was preliminarily cooled in a large tank, until it attained the low degree of cooling and then was pumped by means of a pump through the cooling drum and led back again into the brine tank. In this manner much coldness was withdrawn from the brine, which had to be replaced again by the plant of refrigerating machines. In the latter case a great disadvantage consisted in this, that the stuffing boxes, which should tightly seal the places of entry and exit of the brine tube on the drum, could not always stand up to the high pump pressure and became untight.

In order to remedy these inconveniences, according to the present invention the evaporator of the refrigerating machine is to be built within the revolving casing of the cooling drum and in such a manner that it remains stationary in the said cooling drum. The remaining hollow space in the drum is filled up with brine, which is introduced into the drum by an expansion vessel arranged on a hollow axle and which can expand by temperature variation into the said vessel.

The evaporator built in the drum consists of a hollow vessel on the lower side of which a pocket is welded for the reception of the liquid ammonia solution. On the opposite, upper, side there is another similar pocket. These two pockets are connected with one another by a large number of tubes in which the liquid ammonia, which is introduced into the lower pocket, evaporates, collects in the upper pocket and is sucked off in the gaseous state through a pipe conduit by a compressor.

The inner surface of the drum casing is provided with longitudinal and cross ribs. The brine in the drum is agitated during the rotation of the drum casing and must rub against the cold evaporator tubes; it takes up the coldness emanating from these and transfers the latter again to the outer casing.

One constructional form of the subject of the invention is shown by way of example in the accompanying drawings.

Figure 1 shows the whole arrangement in sectional elevation;

Figure 2 shows a cross-section of the arrangement seen from the right-hand side of Figure 1, a part of the drum being removed;

Figure 3 shows a front view, and

Figure 4 a side view from the right.

The cooling drum 1 rotates in a stationary wood casing 2, which is lined with aluminum and holds the cold emanating from the drum and reflects on the exterior surface of the emulsion layer applied to the drum. The drum 1 is mounted by means of its hollow axles 3, 3' in the collar bearings 4, 4', and is set into rotation by a worm drive 5 which is driven by means of an electro-motor. The fat emulsions to be cooled are uniformly applied in a thin layer to the drum surface 7 by means of an applying device 6 and always after a rotation of the drum 1 are removed cleanly from the drum in the thoroughly cooled state by means of the knives 8. The cooled emulsion layer, only about 0.2 mm. thick, falls from the drum in the form of a band or film onto a transport device, by which it is forwarded to kneading machines for working up to the finished state.

Within the cooling drum 1 an evaporator is constructed, in which the cooling agents introduced, such as e. g. liquid ammonia, evaporate and are sucked out by a compressor. This evaporator consists of a hollow vessel 9, on which are welded on the lower side a distributing pocket 10 and on the upper side a collecting pocket 11, which pockets are connected with one another by means of a large number of semi-circularly bent tubes 12, 12'. On the right-hand side surface 13 of the hollow vessel 9 a strong-walled pipe 14 is attached by means of a flange 15, in which pipe the liquid cooling agent to be evaporated, e. g. ammonia solution, is introduced and is led through the tube 17 into the distributing pocket 10, in which the liquid cooling agent evaporates in order to reach the collecting pocket 11 through the collection of tubes 12, 12', from which pocket the warmed cooling vapours are led off through the tube 18 and the pipe 19 and are sucked off by the compressor of the refrigerating machine attached at 20. The pipe 19, as well as the pipe 14, is constructed with particularly thick walls and is attached in the same way to the side wall 13' by means of a flange 15'. This evaporating member formed in this way is freely suspended in the drum by means of pipes 14 and 19 inserted in the hollow axles 3, 3' and mounted on the interior side in roller bearings 21, 21'. At the outer ends of the hollow axles 3, 3' the pipes 14 and 19 run through stuffing boxes 22, 22'. The ammonia supply tube coming from the condenser of the refrigerating machine is tightly attached at 16 by means of flanges on to the entry tube 14, and the suction tube of the compressor is attached similarly, so that no gases can escape into the factory and the evaporator in the drum itself cannot rotate.

The vacant annular space 23 between the cooling drum 1 and the vessel 9 is kept full of brine from the vessel 24 by means of the expansion tube 25 and the ducts 26, which brine completely jackets the evaporator in the drum. By the rotation of the cooling drum a part of the brine is agitated by the longitudinal ribs 27 cast on the interior surface of the drum casing, so that efficient rubbing of the brine against the evaporator tubes 12 occurs, whereby the coldness of the evaporator tubes 12 is taken up by the brine and is transferred to the drum casing 1, on the outer surface of which the thinly-applied layer of margarine emulsion solidifies in about 2 seconds, and therefore is cooled through and through.

What I claim is:

1. An apparatus for cooling fat emulsions and the like, comprising a revolving cooling drum, means for applying to the said cooling drum the material to be cooled, and a cooling device, directly connected with a refrigerating machine, arranged within the interior of said drum, the evaporator of a refrigerating machine being constructed within the hollow space of the drum, said evaporator consisting of a hollow vessel having two headers extending substantially the entire length within the hollow vessel connected with one another by several semi-circular tubes, within which vapourize the cooling agents which are supplied and withdrawn through tubes led through the hollow shafts of the revolving drum, as set forth.

2. An apparatus for cooling fat emulsions and the like, comprising a revolving cooling drum, means for applying to the said cooling drum the material to be cooled, and a cooling device, directly connected with a refrigerating machine, arranged within the interior of said drum, the evaporator of a refrigerating machine being constructed within the hollow space of the drum, said evaporator consisting of a hollow vessel having two headers extending substantially the entire length within the hollow vessel connected with one another by several semi-circular tubes, within which vapourize the cooling agents which are supplied and withdrawn through tubes led through the hollow shafts of the revolving drum, the said evaporator remaining stationary during rotation of the said drum and being rigidly connected with the supply tubes of the cooling agent and the suction withdrawal tubes of the heated gases, as set forth.

3. Constructional form of the apparatus claimed in claim 2, in which the supply tube and the suction withdrawal tube for the cooling agent are led through the hollow shafts of the cooling drum and are mounted therein by means of roller bearings, as set forth.

4. Constructional form of the apparatus claimed in claim 1, in which the annular space between the drum casing and the said hollow vessel is maintained full of brine from an expansion vessel by means of ducts between the suction withdrawal tube and the hollow shaft of the drum, which brine accordingly by temperature variation can expand and contract, as set forth.

In testimony whereof I have signed my name to this specification.

WILHELM GOTTHILF SCHROEDER.